Dec. 11, 1928.  
E. KENNEDY  
PIPE JOINT  
Filed Sept. 9, 1926
1,694,822
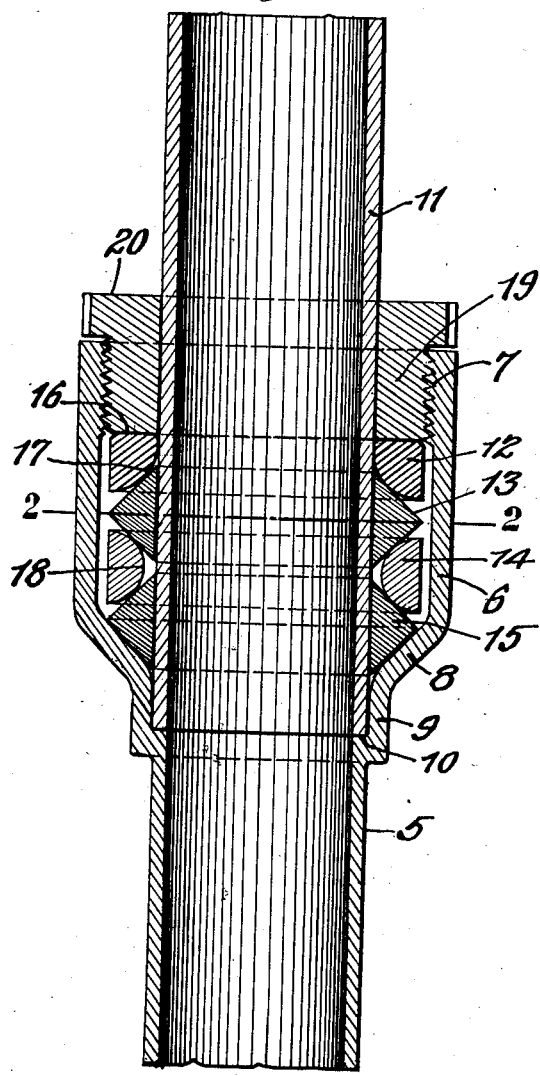
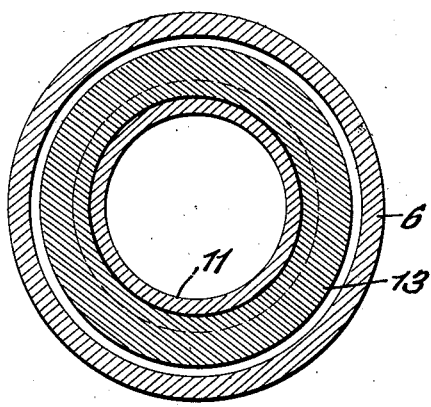
INVENTOR  
Edward Kennedy  
BY C. P. Goepel  
ATTORNEY Patented Dec. 11, 1928.

1,694,822

UNITED STATES PATENT OFFICE.

EDWARD KENNEDY, OF NEW YORK, N. Y.

PIPE JOINT.

Application filed September 9, 1926. Serial No. 134,367.

This invention relates to pipe joints, and has for its primary object to provide simple, effective and inexpensive means for producing a water tight joint or connection between the ends of two pipe sections.

Heretofore, it has been common practice to provide the end of one pipe section with an enlargement or bell to receive the end of an aligned pipe section and to seal the joint by pouring molten lead into the space between the bell wall and the latter pipe section and finally calking the joint with a suitable metallic packing inserted into said bell upon the lead. This is a tedious and time-consuming operation, and it is the purpose of my present improvements to materially expedite the operation of joining or connecting the pipe sections with each other with the complete assurance of an absolutely water tight joint.

With the above and other objects in view, the invention consists in the improved pipe joint, and in the form, construction and relative arrangement of the several parts as will be hereinafter more fully described, illustrated in the accompanying drawing, and subsequently incorporated in the subjoined claim.

In the drawing, wherein I have disclosed one simple and practical embodiment of the invention, and in which similar reference characters designate corresponding parts throughout the several views,—

Figure 1 is a longitudinal sectional view of the adjacent aligned ends of two pipe sections illustrating one embodiment of my improved joint connection, and Fig. 2 is a horizontal sectional view taken on the line 2—2 of Fig. 1.

Referring in detail to the drawing, 5 designates one of the pipe sections which is provided at one of its ends with a cylindrical enlargement or bell 6. The wall of this bell at its open end is internally threaded as at 7 and adjacent its other end is formed with an inwardly tapering section 8 and a reduced cylindrical end portion 9, said latter portion of the bell wall at its juncture with the body wall of the pipe section 5 providing an internal annular shoulder 10.

The other pipe section 11 which is of the same diameter as the section 5 is adapted to be inserted within the bell 6 of the latter pipe section and seated at its end upon the shoulder 10. Prior to such insertion of the end of pipe section 11 into the bell 6, there is loosely arranged on said pipe section 11, first, a brass ring 12, secondly, a lead ring 13 of triangular form in cross section, thirdly, another brass ring 14, and finally, a second lead ring 15 also of triangular cross sectional form. The brass ring 12 is likewise of general triangular shape or form in cross section and has two plane surfaces, one of which indicated at 16 extends in a plane at right angles to the pipe section 11. The surface of said ring 12 is rounded or convex as at 17. The other brass ring 14 is of semi-cylindrical cross sectional form having a plane outer peripheral face and an inner convex face or surface 18. This latter ring being positioned between the two triangular shaped lead rings 13 and 15, it is apparent that the convex surface 18 will have tangential contact with the opposed oppositely inclined faces of said lead rings as shown in the drawing. The convex surface 17 of the ring 12 has similar contact upon the other inclined surface of the lead ring 13. When the pipe section 11 with the several rings loosely engaged thereon is positioned in the bell end of the pipe section 5 as above explained, the lower inclined surface of the triangular lead ring 15 rests upon the inner surface of the tapering section 8 of the bell wall.

A nut 19 which is loosely engaged on the pipe section 11 is externally threaded to engage the internal threads 7 on the bell wall 6 and is then adjusted downwardly upon the brass ring 12. This nut is provided at one end with a flange 20 having suitably formed lugs or other means on its periphery for the engagement of a wrench therewith. Thus, this nut may be readily turned to exert a gradually increasing pressure on the brass ring 12 which pressure is transmitted through the intermediate lead ring 13 to the brass ring 14 and finally to the other lead ring 15. Thus, the rings 13 and 15 of relatively soft metal will be compressed by the hard metal rings 12 and 14, the convex surfaces of the latter rings deeply indenting the opposite sides of the lead rings and tightly compressing the lead against the wall of the pipe section 11 and between said wall and the tapering or inclined portion 8 of the bell wall 6. In this manner, it is evident that the joint between the two pipe sections 5 and 11 will be tightly sealed and rendered absolutely air and water tight. It is also apparent that such operation may be very quickly performed and in the saving of time and labor incident to the use thereof greatly reduces the expense involved in the making of such joints as heretofore carried out under the old prior art methods.

In the above description and the accompanying drawing, I have disclosed a satisfactory form and arrangement of the several joint forming rings 12, 13, 14 and 15. It is however, apparent that the desired results might possibly be secured by the use of rings of different form, or by employing a greater or less number of such rings. Accordingly, it is to be understood that in these particulars, as well as in the several other details of the construction herein disclosed, numerous modifications might be resorted to and I therefore, reserve the privilege of adopting all such legitimate changes therein as may be fairly incorporated within the spirit and scope of the invention as claimed.

I claim:

The combination with two rigid metal pipe sections, of a plain cylindrical end on one of the sections; a bell formed on one end of and integral with the other section, and telescopically fitted over the plain, pipe end, said bell having inner and outer cylindrical recesses of different diameters, the inner recess being adapted to snugly fit the plain, pipe end, and terminating in a shoulder adapted to abut the rim thereof, and the outer recess being of greater diameter than the inner one, to provide a chamber for packing, and terminating at its inner end in an annular inclined bearing face, the outer end of the packing recess being provided with screw threads; an adjusting nut snugly fitted around the plain, pipe end, and having external screw threads engaging the threads in the packing recess, and an inner pressure transmitting rim; a plurality of packing rings of soft metal fitted in the packing recess, each having an internal cylindrical face intimately contacting the external face of the plain, pipe end, and inclined outwardly converging side faces, the inner inclined face of one of the packing rings being opposed to the inclined bearing face of the packing recess; a compression ring of relatively harder metal than the packing rings, interposed between a pair of the same and having convex faces bearing on the opposed inclined faces of the pair, said compression ring being spaced from the inner surrounding face of the bell and the outer face of the plain, pipe end, a sufficient distance to permit the packing rings to be readily deformed to effect an efficient seal; and a second compression ring of relatively harder metal than the packing rings, having an inner convex side face bearing on the outer inclined side face of the outermost packing ring, and an outer, side bearing face adapted to receive the pressure exerted by the clamping nut.

In testimony that I claim the foregoing as my invention, I have signed my name hereto

EDWARD KENNEDY.